C. E. PATRIC.
Improvement in Grain-Drill.
No. 132,889. Patented Nov. 5, 1872.
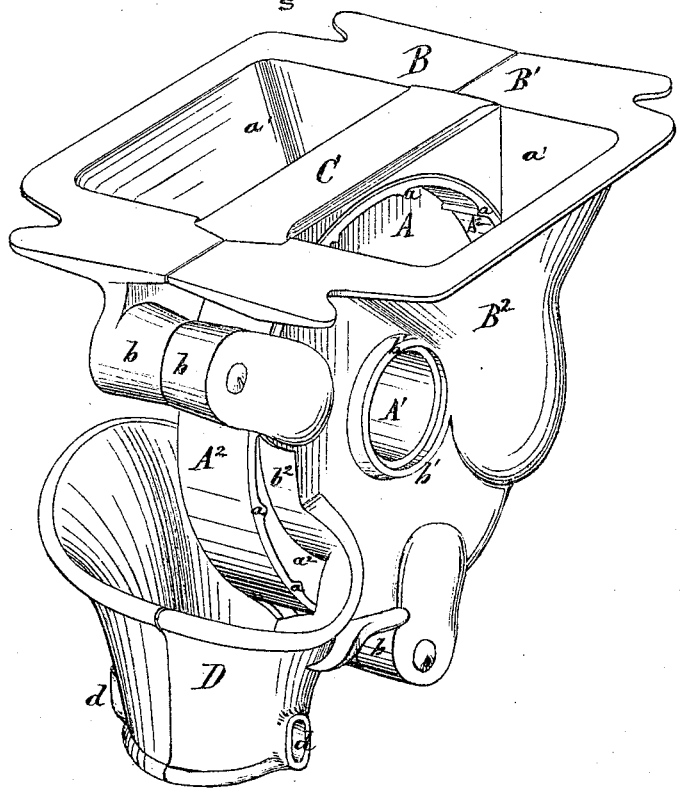
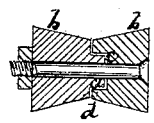
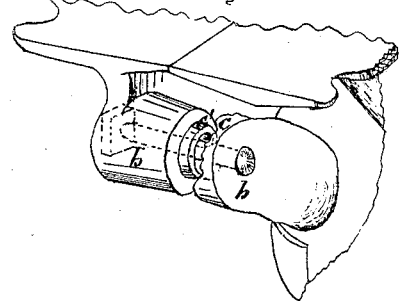
Witnesses
Alex Mahon
H H Doubleday
Charles E Patric
by his Attorney
A M Smith

UNITED STATES PATENT OFFICE.

CHARLES E. PATRIC, OF SPRINGFIELD, OHIO.

IMPROVEMENT IN GRAIN-DRILLS.

Specification forming part of Letters Patent No. 132,889, dated November 5, 1872.

*To all whom it may concern:*

Be it known that I, CHARLES E. PATRIC, of Springfield, county of Clark, State of Ohio, have invented certain new and useful Improvements in Distributing-Cups for Grain-Drills, of which the following is a full, clear, and exact description, reference being had to the accompanying drawing making part of this specification, in which—

Figure 1 is a perspective view of a vertical distributing-wheel and its inclosing cup or casing; Fig. 2 is a similar view of one pair of the interlocking lugs or ears, partly broken away to show the construction; and Fig. 3 is a section through said lugs or ears.

Similar letters of reference denote corresponding parts in all the figures.

My invention relates to that class of grain-drills employing a series of distributer-wheels, each of which is independently mounted in bearings in its own separate cup or casing, and all of which are ordinarily operated by a single through-shaft, usually made square or angular in form for the purpose of rotating the distributer-wheels in their bearings. In this class of machines difficulty has been frequently experienced from the cramping of the distributer-wheels, resulting from the displacement of one of the sections of the inclosing casing in which the bearings of said wheels are formed, thereby changing the relation of the bearings to each other and causing the wheel to bind and work heavily in its inclosing casing. The object of my invention is to overcome this difficulty; and to this end the invention consists in providing the lugs or ears, by means of which the two sections of casing are bolted together, with tubular spurs, matching corresponding cylindrical sockets in the face of the opposing lugs in such manner as to effectually prevent any movement of one part of the casing and the bearings formed therein relatively to the other half of the casing and its bearing, as hereinafter set forth.

In the accompanying drawing, A represents the distributer-wheel; B B', the casing, divided vertically into two nearly equal parts; C, the partition, adapting the wheel and casing to feed upon either side; D, the funnel or delivery spout; A', one hub or journal of the wheel A, mounted in the bearing b' in the part B' of the casing, the opposite hub of the wheel being similarly mounted in a bearing in the part B of the casing. b b are lugs or ears formed upon the parts B B' of the casing, through which said parts are bolted together, as shown in Figs. 2 and 3. These lugs are provided, on their opposing faces, one with a tubular socket, c, and the other with a cylindrical spur, c', the one matching within the other, and serving, when the two sections B B' of the casing are bolted together, to prevent any movement whatever of one part of the casing and the distributer-wheel bearing formed therein relative to the other part of the casing and its bearing, and effectually guarding the wheel against any cramping within its bearings and upon its shaft.

I am aware that interlocking lugs or spurs have been used upon the casings of distributer-wheels in seeding-machines; but, as heretofore constructed, these spurs, so far as I have any knowledge, served only to prevent movement in a single direction; whereas, by my construction, when the sections are bolted together movement of the sections relative to each other in any direction is effectually prevented.

I am also aware that a tube and socket or thimble joint is not new in mechanics, such joint being well known and in common use in various branches of the mechanic arts, and I therefore do not broadly claim such joint; but

Having now described my invention, what I claim as new, and desire to secure by Letters Patent, is—

The divided casing B B', in which the distributer-wheel A has its bearings, provided with lugs having the tubular interlocking spurs and socket c c', substantially as described, and for the purpose set forth.

In testimony whereof I have hereunto set my hand this 29th day of May, A. D. 1872.

C. E. PATRIC.

Witnesses:
 A. P. LINN COCHRAN,
 FRANK. G. MATTOX.